United States Patent
Cui et al.

(10) Patent No.: US 9,569,288 B2
(45) Date of Patent: Feb. 14, 2017

(54) APPLICATION PATTERN DISCOVERY

(71) Applicant: International Business Machines Corporation, Armonk, NY (US)

(72) Inventors: Jie Cui, Beijing (CN); Florian Pinel, New York, NY (US); Biplav Srivastava, Noida (IN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/331,892

(22) Filed: Jul. 15, 2014

(65) Prior Publication Data
US 2016/0019102 A1 Jan. 21, 2016

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 11/34 | (2006.01) |
| G06F 11/30 | (2006.01) |
| G06F 17/40 | (2006.01) |

(52) U.S. Cl.
CPC ............. *G06F 9/542* (2013.01); *G06F 11/302* (2013.01); *G06F 11/3409* (2013.01); *G06F 11/3466* (2013.01); *G06F 17/40* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,778,228 A | * | 7/1998 | Wei | G06F 9/547 709/219 |
| 8,881,182 B1 | * | 11/2014 | Jorgensen | G06F 9/54 719/328 |
| 2004/0015858 A1 | * | 1/2004 | Seto | G06F 9/443 717/120 |
| 2004/0025170 A1 | * | 2/2004 | Cao | G06F 9/4443 719/318 |

(Continued)

OTHER PUBLICATIONS

Tang, R, et al., "An Approach for Mining Web Service Composition Patterns from Execution Logs", Web Systems Evolution (WSE), 2010 12th IEEE International Symposium, IEEE, Sep. 17-18, 2010, pp. 53-62.
Dong, X., et al., "Similarity Search for Web Services", Proceedings of the 30th VLDB Conference, Aug. 31-Sep. 3, 2004, pp. 372-383, vol. 30, Toronto, Canada.
Agrawal, R., et al., "Mining Process Models from Work0ow Logs", Sixth International Conference on Extending Database Technology, Jan. 22, 1998, pp. 469-483.

(Continued)

*Primary Examiner* — H S Sough
*Assistant Examiner* — William C Wood
(74) *Attorney, Agent, or Firm* — Scully, Scott, Murphy & Presser, P.C.; Louis J. Percello, Esq.

(57) ABSTRACT

API associations among a plurality of service application programming interfaces may be identified by analyzing service API call logs, which contain data associated with invocation of the plurality of application programming interfaces by a plurality of applications, wherein sets of APIs that are determined to be called together are identified. For a set of service APIs, a plurality of applications that invoke the APIs in the set is identified. A sequence of API calls by an application in the plurality of applications is identified, wherein multiples sequences of APIs are identified, one sequence of API calls identified respectively for one application in the plurality of applications. An application pattern is determined based on the multiple sequences of service APIs.

20 Claims, 11 Drawing Sheets

(56) References Cited

U.S. PATENT DOCUMENTS

| | | | | |
|---|---|---|---|---|
| 2012/0174058 A1* | 7/2012 | Winkler | ................... | G06F 8/34 |
| | | | | 717/105 |
| 2012/0278659 A1* | 11/2012 | Han | ..................... | G06F 11/302 |
| | | | | 714/38.1 |
| 2013/0091571 A1* | 4/2013 | Lu | ......................... | G06F 21/563 |
| | | | | 726/23 |
| 2014/0282464 A1* | 9/2014 | El-Gillani | ................ | G06F 8/61 |
| | | | | 717/168 |
| 2015/0082441 A1* | 3/2015 | Gathala | .................. | G06F 9/541 |
| | | | | 726/25 |
| 2015/0128156 A1* | 5/2015 | Zhu | .......................... | G06F 8/74 |
| | | | | 719/328 |

OTHER PUBLICATIONS

Weijters, A.J.M.M., et al., "Rediscovering Workflow Models from Event-Based Data", Proceedings of the 11th Dutch-Belgian Conference on Machine Learning Benelearn, (Month unknown) 2001, pp. 93-100.

Van Der Aalst, W.M.P., et al., "Workflow mining: A survey of issues and approaches", Data & knowledge engineering, accepted Feb. 26, 2003, pp. 237-267, 47(2).

Yaman, F., et al., "A Context Driven Approach for Workflow Mining", Proceeding IJCAI'09 Proceedings of the 21st international joint conference on Artifical intelligence, Jul. 11-17, 2009, pp. 1798-1803.

\* cited by examiner

APPLICATION PATTERN DISCOVERY

FIELD

The present application relates generally to computers, and computer applications, and more particularly to discovering application pattern in computer applications.

BACKGROUND

A developer may program computer applications using a plurality of service application programming interfaces (APIs). An application pattern may be discovered by analyzing applications that developers have created and identifying reusable configurable composition of service APIs, for example for replicable business scenarios. In an API centric application, the composition of services represents an orchestration and provides a perspective in the application pattern. In the current approach to creating an application pattern, experts create a pattern based on existing applications.

BRIEF SUMMARY

A method for application pattern discovery, in one aspect, may comprise receiving application programming interface (API) call logs. The application programming interface call logs may comprise data associated with invocation of a plurality of application programming interfaces by a plurality of applications. The method may also comprise identifying API associations among said plurality of application programming interfaces by analyzing the API call logs. The identifying of the API associations identifies sets of APIs that are determined to be called together. The method may also comprise selecting a set of APIs from the sets of APIs. The method may further comprise identifying a plurality of applications that invoke the set of APIs. The method may also comprise identifying a sequence of API calls by an application in the plurality of applications, wherein multiples sequences of APIs are identified, one sequence of API calls identified respectively for one application in the plurality of applications. The method may also comprise determining an application pattern based on the multiple sequences of APIs.

A system for application pattern discovery, in one aspect, may comprise a storage device storing application programming interface (API) call logs. The application programming interface call logs may comprise data associated with invocation of a plurality of application programming interfaces by a plurality of application. A hardware processor may be operable to identify API associations among said plurality of application programming interfaces by analyzing the API call logs, wherein the identifying API associations identifies sets of APIs that are determined to be called together. The hardware processor may be further operable to select a set of APIs from the sets of APIs. The hardware processor may be further operable to identify a plurality of applications that invoke the set of APIs. The hardware processor may be further operable to identify a sequence of API calls by an application in the plurality of applications, wherein multiples sequences of APIs are identified, one sequence of API calls identified respectively for one application in the plurality of applications. The hardware processor may be further operable to determine an application pattern based on the multiple sequences of APIs.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
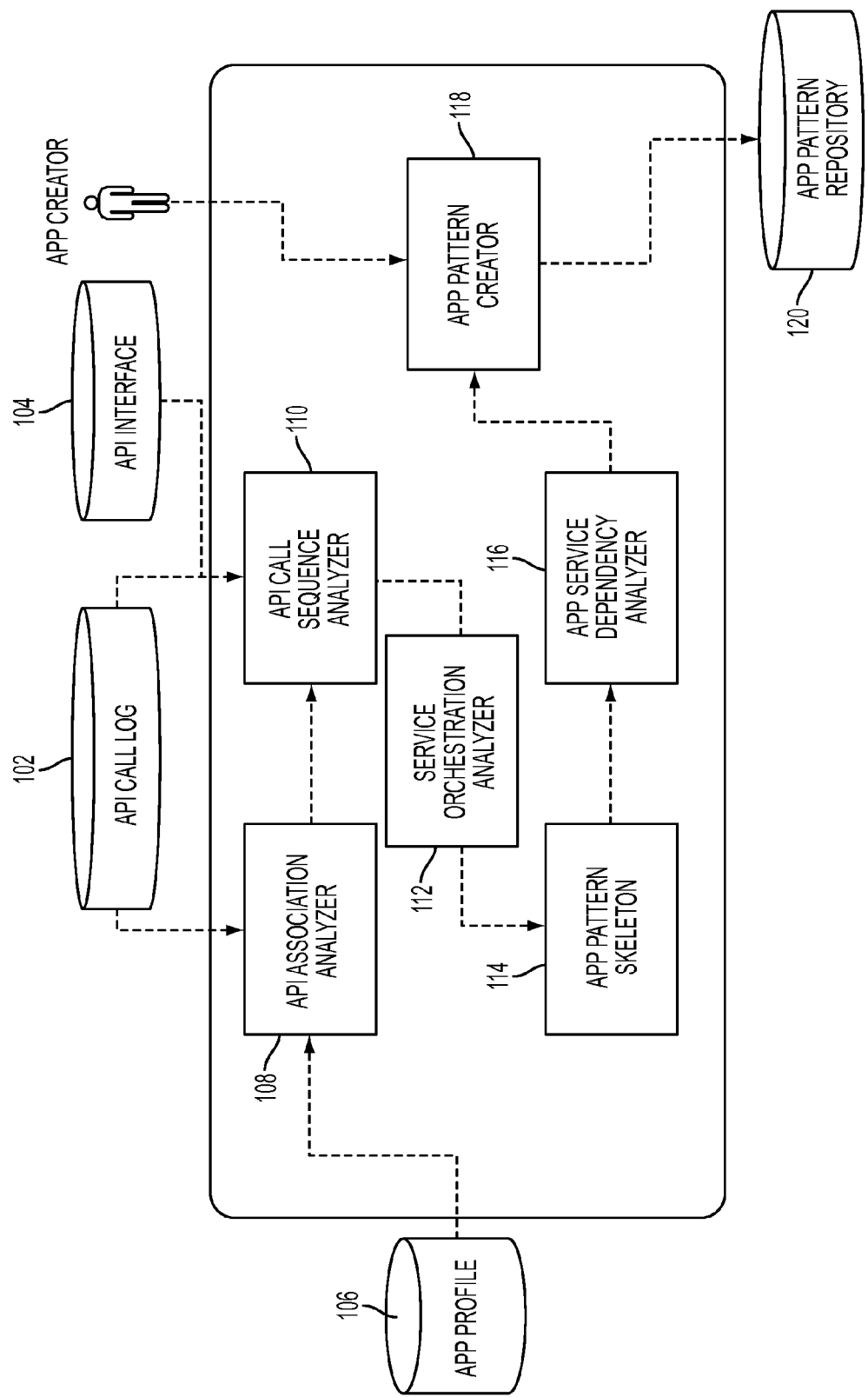
FIG. 1 is a diagram illustrating system components for discovering application patterns in one embodiment of the present disclosure.

In one embodiment of a methodology of the present disclosure, application patterns may be discovered from service application program interface (API) invocation records and/or logs on one or more runtime platforms. For example, a computer platform may maintain numerous records about which service APIs are invoked by applications and when. Such records may implicate many similar usage scenarios and may be used as a source for application pattern discovery.

In a cloud environment, the set of service APIs found or discovered according to the methodology of the present disclosure may be bundled together for various purposes, such as marketing, monitoring, and/or metering. Users may be enabled to select the APIs in the discovered application pattern, e.g., in a cloud environment to bundle together to create a user defined (services) system.

In the present disclosure, APIs refer to service APIs, such as REST resources. For example, a service API is an interface of a web service (e.g., Simple Object Access Protocol (SOAP), Representational state transfer (REST)). RESTful APIs are examples of service APIs. A pattern refers to a preset composition of service APIs. An application pattern may comprise a set of APIs and the sequence in which those APIs are used including input and output mappings of the APIs in the sequence.

In one embodiment of the present disclosure, a pattern can be provided as an application template using service APIs where the API binding and configuration properties have been parameterized.

Consider, for example, a product recommendation application. An application may analyze a vendor's catalog, and also a customer purchase history, and based on the analysis, provide product recommendation to the customer. In this example application, there may be two APIs, an API that returns the vendor catalog and another API that returns the customer purchase history. The application may also include additional code that determines and provides recommended products. In this example application, a pattern may be discovered that includes 'get customer purchase history' API and 'get vendor's catalog' API. The product recommendation algorithm is reusable as long as the algorithm receives two pieces of information (e.g., vendor catalog information and customer purchase history information). That is, the algorithm may be able to function for any catalog and any purchase history. Application pattern may thus be parameterized for different vendors, e.g., for reusability. For instance, parameters may include different URL for accessing different vendor catalog and different customer purchase history. Another parameter may include an API key for accessing different APIs. The key here is used as a way to authenticate the person who calls the API. A developer who is interested in developing a similar product recommendation application may take this application pattern, and use it by mapping (or providing) parameters that are specific to the developer's application, e.g., a specific vendor catalog and a specific customer purchase history data.

In another aspect, the application pattern discovery may also include a sequence of APIs used and how an output from one API is used as an input to a subsequent API that is invoked, e.g., mappings between the APIs, for example, from one call to another call. For example, continuing with the product recommendation application example, the pattern discovery may include information that specific product identifiers were retrieved from the 'get customer purchase history' API and passed to the 'get vendor's catalog' API.

An application pattern discovery methodology in one embodiment of the present disclosure may take as inputs an API catalog and API call log. An API catalog may include information such as API metadata. The API catalog may also include application metadata, if available. API metadata may describe an API, for example, resources, format, request messages and response messages. Application metadata may contain a description of an application and keywords used in the application, and/or others. An API call log may be stored by a runtime platform, for example, responsive to an application accessing, calling or invoking an API. An API call log may contain information about the invocation of the API such as input and output messages, timestamp (time of the invocation), which application called the API, what API call preceded this API, what API was invoked subsequent to this API, and other information. An example of logged information is a hypertext transfer protocol (HTTP) server log, e.g., "[15/Mar/2013:19:50:13+0100]" POST http://www.dummy.com/exampleservice." This log identifies the time the POST request was sent and the uniform resource locator (URL) the POST was sent with, and the API (in this example, "exampleservice"). Such log may also identify response and request messages. HTTP request, for example, shows a request, a response, the name of the application, and time. Another example may include completed HTTP requests and responses (to obtain this type of information, a browser side plugin may be utilized). Other examples of API call log may include client activity such as operation name, performer, status and timestamp; process information such as calling sequence, input/output transforming activity, and others.

The application pattern discovery methodology in one embodiment of the present disclosure may output the following: Set of application patterns with each application pattern representing a discovered API composition. A ranking function may be used to select a subset of patterns discovered, e.g., to reduce the list of all discovered application patterns.

The application pattern discovery methodology in one embodiment of the present disclosure may generate the application pattern skeleton and API dependencies by analyzing the APIs called in association by applications serving same business scenarios.

Figure 2:
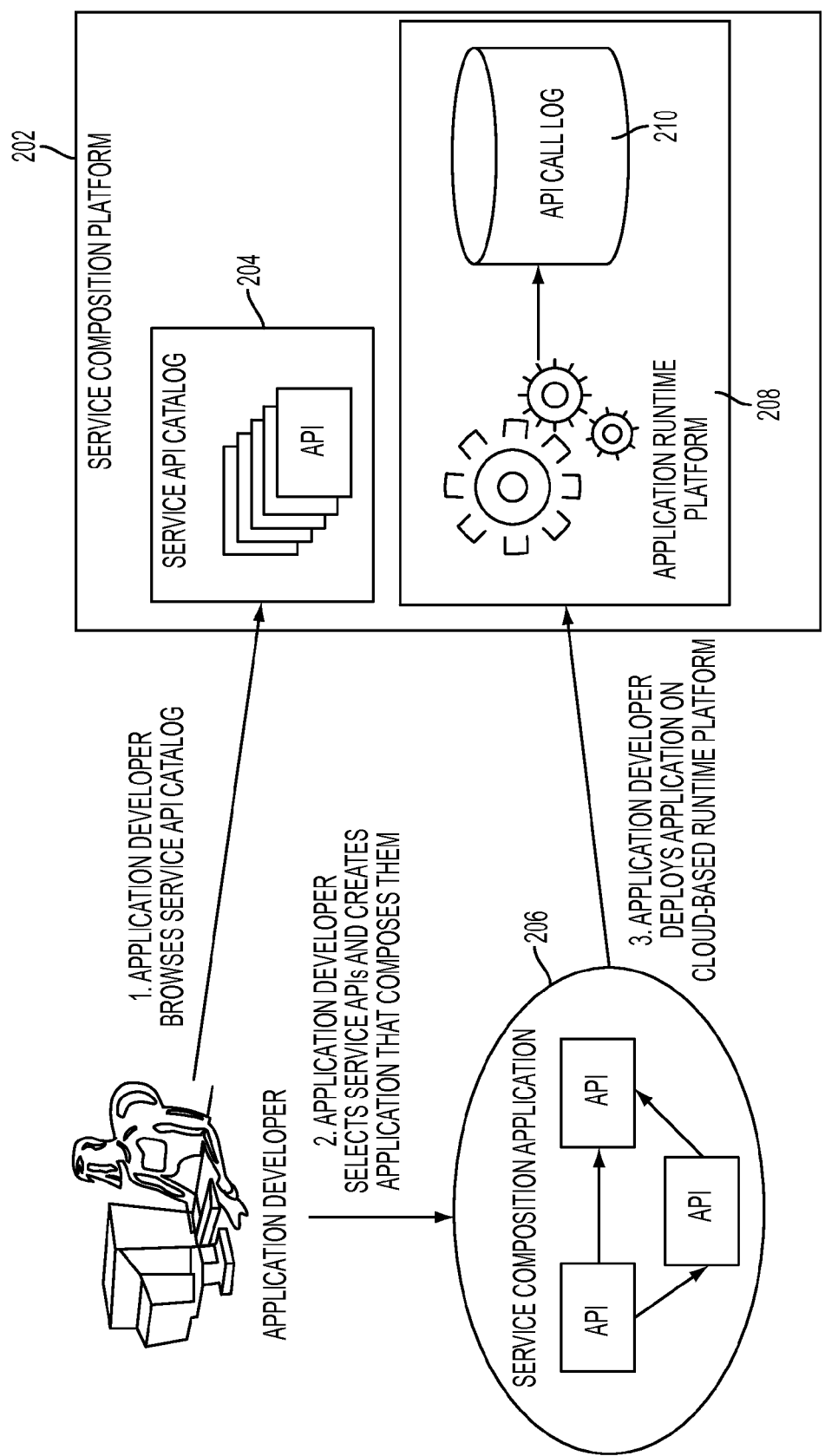
FIG. 2 illustrates a process of how an API Call log may be created and stored in one embodiment of the present disclosure.

FIG. 1 is a diagram illustrating system components for discovering application patterns in one embodiment of the present disclosure. The components may comprise one or more storage devices and one or more computer executable components that run on one or more hardware processors. API Call log 102 that contains information about API invocations may be stored in a storage device. API Interface 104 may include plurality of APIs, for example, that a developer may access and use in developing an application. API Interface 104 may be stored in a storage device. FIG. 2 illustrates, for example, a process of how an API Call log may be created and stored. An application developer may browse a service API catalog 204, e.g., available on a service composition platform 202. The application developer may select one or more service APIs from the catalog 204 and create an application 206 that composes them. The application developer may deploy the composed application 206 on a runtime platform 208, e.g., a cloud-based runtime platform. The runtime platform 208 executes the application 206 and logs data associated with running the application, e.g., the APIs the application 206 invokes during the execution, and other information as the application runs. For example, API request and response may be logged. The logs may be written to or stored in an API Call log 210.

Referring back to FIG. 1, an API Association Analyzer 108 analyzes API associations from the data obtained in API Call log 102. The API Association Analyzer 108 may also utilize data associated with application profile, e.g, stored as App Profile shown at 106. The API Association Analyzer 108 identifies possible candidate patterns of APIs, e.g., a set of APIs. For instance, the API Association Analyzer 108 identifies sets of APIs that are used together in a number of applications.

A set of APIs may be selected for processing at a time. In one embodiment, each set of APIs may be processed, iteratively.

An API Call Sequence Analyzer 110 reverse engineers API call sequence and identifies an order in which the APIs are called in the application that uses the selected set of APIs. The reverse engineering in one aspect may discover inputs and output of the APIs and map one or more inputs of an API with one or more outputs of another API. The mappings generate a sequence, which estimates the invocation order of the APIs invoked by the applications that use the APIs in the set. The sequence of APIs may include the APIs in the selected set and other APIs (infrequent APIs) that the application invokes. Such sequence may be generated for all of the applications that use the selected set of APIs, resulting in a plurality of such sequences. Based on the plurality of sequences, an application pattern (an average of all the sequences) may be built.

A Service Orchestration Analyzer 112 analyzes the API call sequence and generates an application pattern skeleton 114 of the APIs. The Service Orchestration Analyzer 112, e.g., takes the application pattern built by the API Call Sequence Analyzer 110, and determines variables that are inputs and outputs to the application pattern.

An App Pattern Service Dependency Analyzer 116 determines API dependencies for an application pattern. For example, the application pattern may include those APIs that are to be used as is, and one or more generic APIs. The generic APIs are to be replaced with specific APIs to meet the developer's objective. The App Pattern Service Dependency Analyzer 116 discovers and recommends those specific APIs. The recommendation may be based on which specific APIs the applications have used in the past, e.g., from the history of API logs.

An App Pattern Creator 118 takes the results, e.g., the discovered application pattern and stores the result in an App Pattern Repository 120. The result for example may be stored in the form of the application pattern, inputs and outputs to the APIs in the application pattern, and the description of the functionality of the application pattern. The App Pattern Creator 118 may also have user interface functionalities that allow a user (e.g., application creator) to browse through the available application patterns and select one or more for developing an application.

Figure 3:
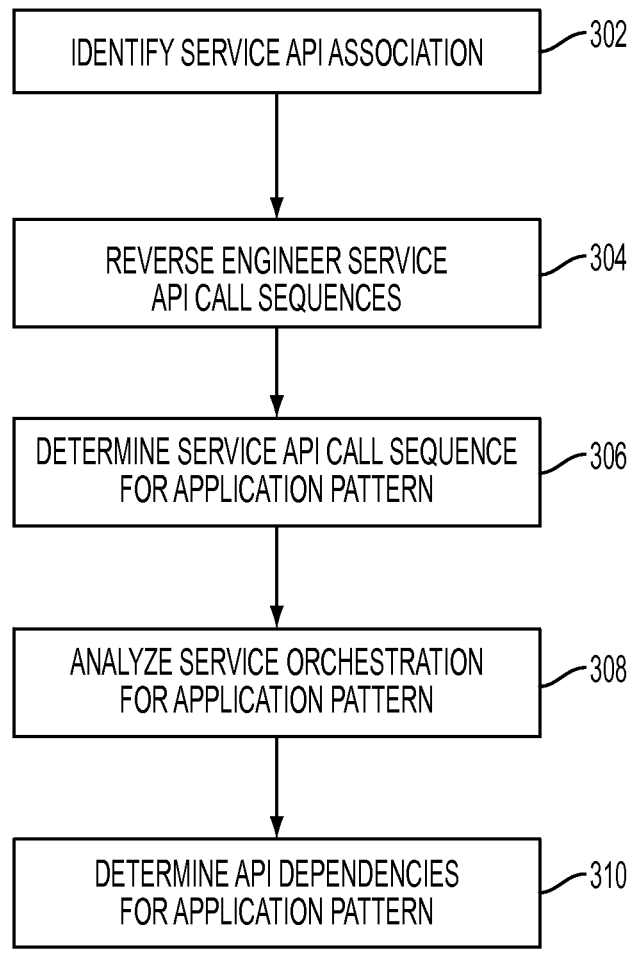
FIG. 3 is a flow diagram illustrating a method for discovering application patterns in one embodiment of the present disclosure.

FIG. 3 is a flow diagram illustrating a method for discovering application patterns in one embodiment of the present disclosure. The logic flow may be performed iteratively to discover a plurality of application patterns. At 302, API associations are identified, e.g., by an API association analyzer component 108 shown in FIG. 1. For example, the method in may include receiving application programming interface (API) call logs. The application programming interface call logs may comprise data associated with invocation of a plurality of application programming interfaces by a plurality of applications, e.g., as described above. The method may include identifying API associations among the plurality of application programming interfaces by analyzing the API call logs. The identifying of API associations identifies sets of APIs that are determined to be called together. The method may also include selecting a set of APIs from the sets of APIs for processing. In one embodiment, the method may repeat the following processing for each of the sets of APIs. For the selected set, the method may include identifying a plurality of applications that invoke the set of APIs. Identifying of API associations is further described in detail with reference to FIG. 4.

At 304, API calls identified at 302 are reversed engineered to identify the order of the API calls, e.g., by an API call sequence analyzer component 110 shown in FIG. 1. For example, the method may include identifying a sequence of API calls by an application in the plurality of applications, wherein multiples sequences of APIs are identified, one sequence of API calls identified respectively for one application in the plurality of applications. Identifying the order or sequence of API calls is further described with reference to FIGS. 5-8 below.

At 306, API call sequence is determined for an application pattern. For instance, an application pattern is determined based on the multiple sequences of APIs identified at 304. Determining an application pattern based on the multiple sequences of APIs is further described with reference to FIG. 9 below.

At 308, analysis of service orchestration for application pattern is performed, e.g., by a service orchestration analyzer component 112 shown in FIG. 1. At 310 API dependencies for application pattern are determined, e.g., by an app service dependency analyzer component 116 shown in FIG. 1.

Figure 4:
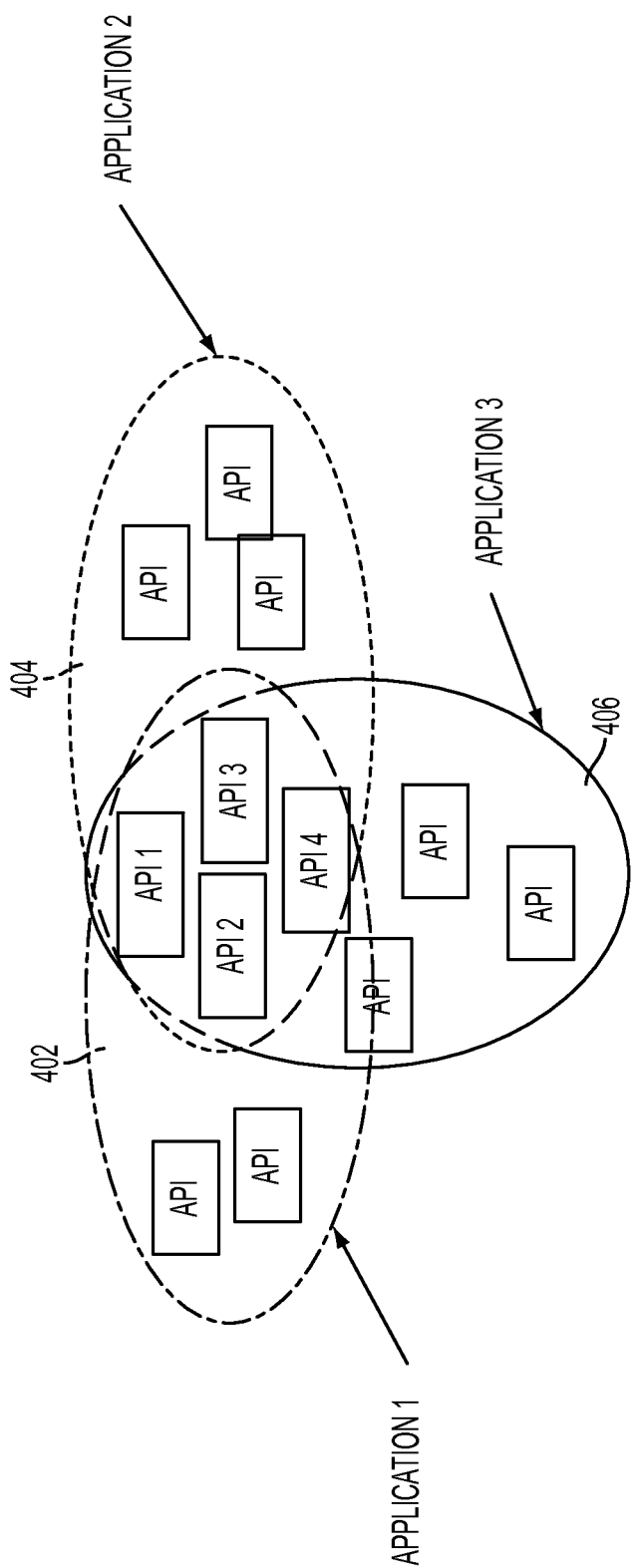
FIG. 4 shows example patterns identified in one embodiment of the present disclosure.

FIG. 4 shows example patterns identified in one embodiment of the present disclosure. The example diagram illustrates identifying common APIs shared by a plurality of applications. APIs used by more than one application or a predefined number of applications may be referred to as a frequent set of APIs, those that are used by only one application may be referred to as an infrequent set of APIs. In the diagram, API 1, API 2, API 3, and API 4 are used by all three applications, Application 1, Application 2 and Application 3. Thus, API 1, API 2, API 3, and API 4 are referred to as a frequent set. The APIs shown without index are infrequent set of APIs in this example.

API associations may be identified (e.g., at 302) by using server logs, e.g., stored in API call log and identifying a set of service APIs called by a plurality of applications being considered in the API association. Frequent service API sets may be identified by applications, e.g., those applications serving the same or similar business scenario using algorithms such as a priori or FP-growth. The degree of frequency may be preset or predefined. For example, a set of APIs occurring together a predefined number of times may be determined as a frequent set. In addition, a priori knowledge may be used ahead of time of possible orderings among APIs based on their description to validate the discovered APIs sets. From the sets of discovered APIs, a set is selected for processing in the next steps in application pattern discovery of the present disclosure. In one embodiment, the next steps may be iterated (loop through) for all sets. All applications that use selected API set may be considered. Service APIs that are used by applications but are not part of the frequent set are referred to as infrequent APIs.

Figure 5:
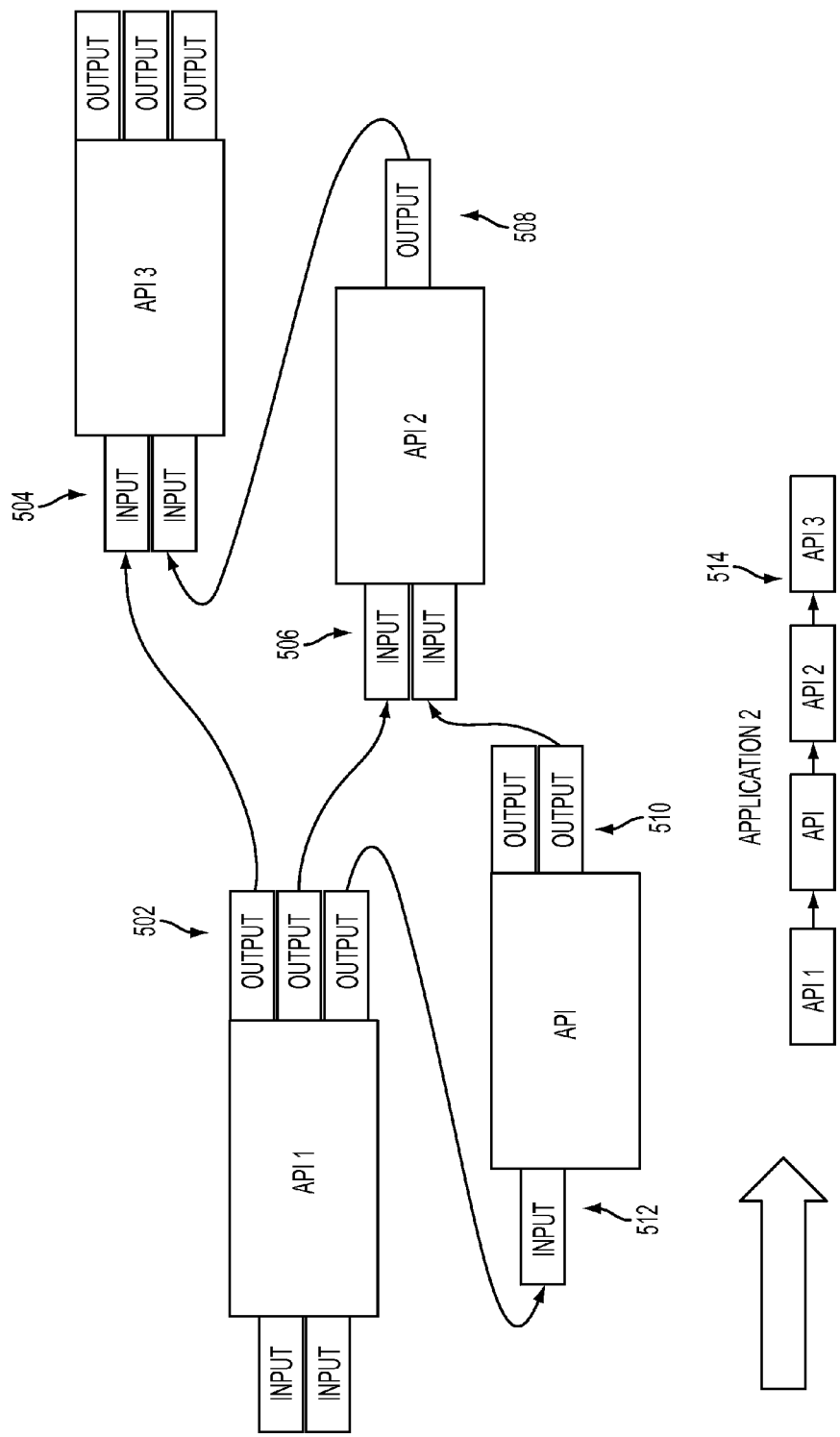
FIG. 5 is a diagram illustrating reverse engineering of API calls to identify the order in which the APIs are called by an application in one embodiment of the present disclosure.

FIG. 5 is a diagram illustrating reverse engineering of API calls to identify the order in which the APIs are called by an application in one embodiment of the present disclosure. The procedure shown in FIG. 5 may be performed for each of the applications that use the selected API set. For instance, for each application, information in API call log such as timestamp that shows the time of the API invocation (call) and input and output values of the API, is used to connect service APIs in the selected set by mapping their input and output values. For example, it may be discovered that the application being considered used output of API 1 (502) as input to API 3 (504) and input to API 2 (506); output of API 2 (508) as input to API 3 (504); output of API 1 (502) as input to API (512); output of API (510) as input to API 2 (506). The reverse engineered sequence for this example is shown at 514. That is, the order of the API invocations is determined to be API1, API, API2 and API3 in this example.

Figure 6:
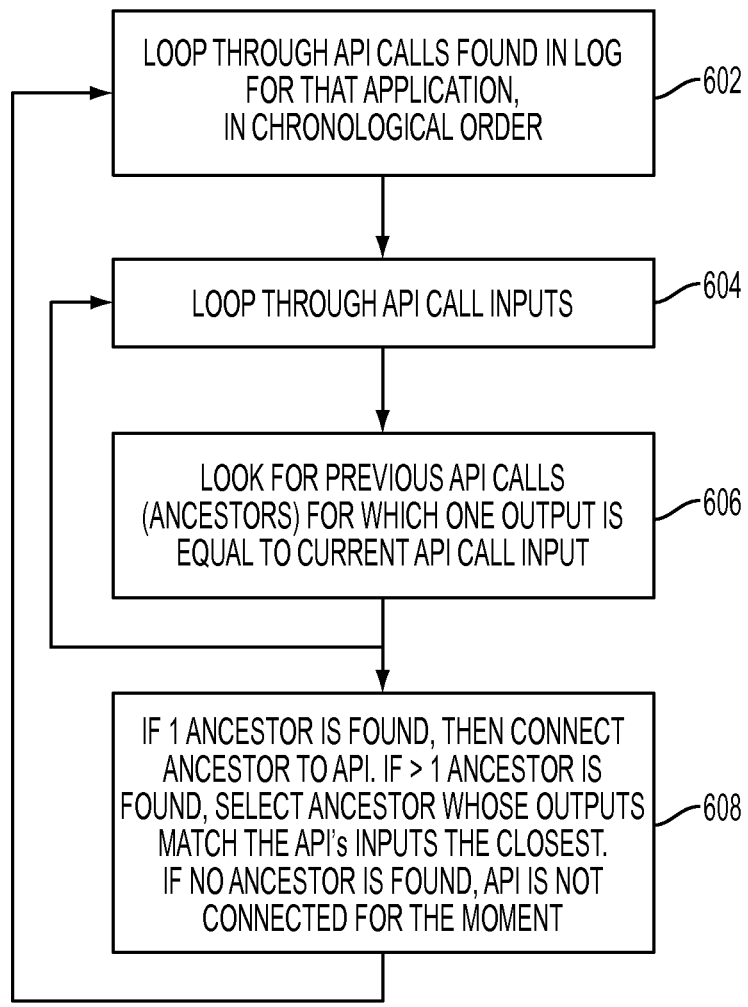
FIG. 6 is a flow diagram illustrating a method for identifying an API call sequence by reverse engineering in one embodiment of the present disclosure.

FIG. 6 is a flow diagram illustrating a method for identifying API call sequence by reverse engineering in one embodiment of the present disclosure. At 602, for an application, API calls found in API call log (APIs called by the application) are identified in chronological order. This may be achieved by analyzing the timestamp associated with the API invocations. At 604, API call inputs are identified from the API call log. At 606, previous API calls (ancestors) which have one output is equal to current API call input are determined. The processing of 604 and 606 are repeated for all API calls. At 608, if an ancestor is found, the current API is connected (or linked) to the ancestor API. If more than one ancestor is found, ancestor whose outputs match the API's inputs the closest is selected. An example metric for determining the closest ancestor may be the number of ancestor outputs mapped to the current API inputs; e.g., an ancestor API that has the greatest number of its outputs mapped to the current API's input may be determined as being the closest. Another example metric for determining the closest ancestor may be comparing the names of the inputs and outputs; e.g., an ancestor that has the greatest number of its outputs whose names match the current API inputs may be determined as being the closest. If no ancestor is found, the current API is not connected to another. The algorithm shown in FIG. 6 determines a call sequence of APIs for a given application.

Figure 7:
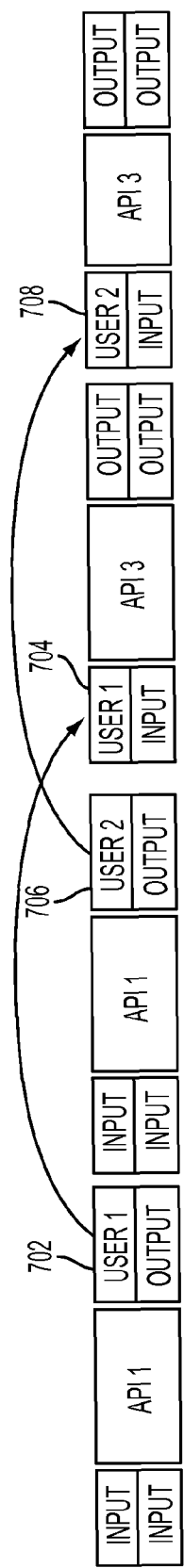
FIG. 7 shows mappings of APIs in one embodiment of the present disclosure.

FIG. 7 shows mappings of APIs in one embodiment of the present disclosure. The mappings for example, may be generated using the algorithm shown in FIG. 6. Inputs and outputs can be complex messages. A mapping can involve the whole message, or only one or more fields included in the message. For example, API 1 may return a user object, and API 3 may consume a user ID. API 1 should be connected to API 3 if the ID extracted from the user object matches the user ID passed to API 3. Other inputs can be the result of programmatic transformations implemented in the application code. In one aspect, the algorithm does not need to map all the inputs and outputs. Only 1 mapping is necessary to connect 2 APIs in a sequence. However, the more mappings are discovered, the more accurate the application pattern may be. The API call log may contain call sequences that occur in parallel, e.g., if multiple end users use the application at the same time. Unlike business process execution engines that typically identify execution instances, there may be no direct way to separate 2 instances calling the same API sequence concurrently. However, the input/output mappings are used to isolate possible execution instances. For example, shown at 702 and 704, the API call log may contain information that API 1's output 'user 1' was used as input to API 3; and shown at 706 and 708, API 1's output 'user 2' was used as input to API 3. From that information, input/output mapping of API 1 and API 3 may be determined, even if not entire output of one API was used as an input to another API.

Figure 8:
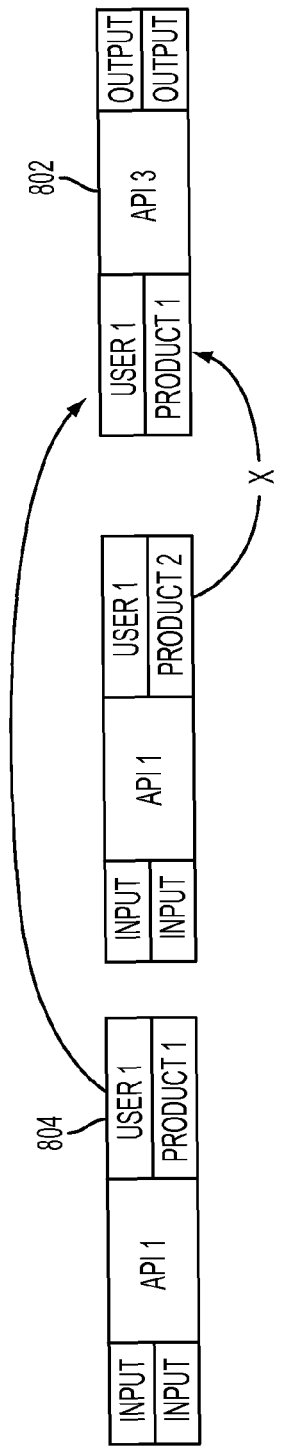
FIG. 8 shows another example of mappings of APIs in one embodiment of the present disclosure.

FIG. 8 shows another example of mappings of APIs in one embodiment of the present disclosure. The algorithm shown in FIG. 6 may result in more than one sequence instance to which a given API call can be attached. In case of ambiguity, in one embodiment of the methodology of the present disclosure, ambiguity may be resolved by connecting an API to another, to which the API has a maximum number of inputs mapped. For example, shown in FIG. 8, API 3 (802) is attached to the sequence instance that allows to map the maximum number of its inputs (804). The resulting API sequences may be made error-tolerant using the following steps.

Figure 9:
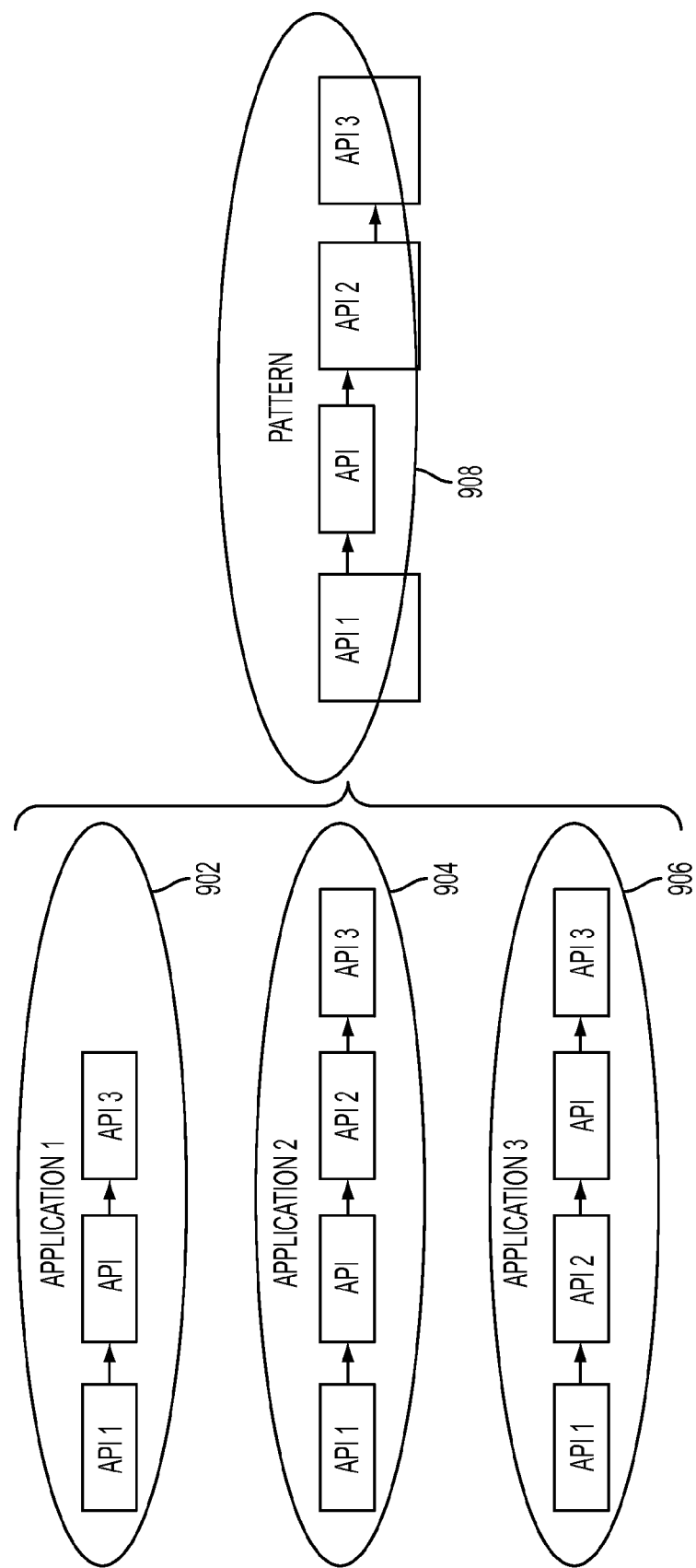
FIG. 9 is a diagram illustrating determining of a service API call sequence for application pattern in one embodiment of the present disclosure.

FIG. 9 is a diagram illustrating determining of service API call sequence for application pattern in one embodiment of the present disclosure, e.g., shown at 306 in FIG. 3. For example, the algorithm shown in FIG. 6 may be used to identify call sequences of APIs for all applications (or set of applications that are being considered) that are identified to have invoked or used the selected set of APIs (e.g., referred to at 302 in FIG. 3). The identified service API call sequence of all the applications that share the frequent API set is used to build a new "average" sequence. The average sequence can be defined as the sequence that minimizes the sum of edit distances to other sequences, e.g., a sequence that is closest to all identified sequences, e.g., that requires fewest changes to go to the application specific sequence. For instance, the average sequence that has the smallest distance to all identified sequence is determined. In one aspect, clustering can be applied to identify more than one sequence. Infrequent APIs may be all considered as one single API. For example, consider that the algorithm shown in FIG. 6 identified call sequence of API 1, API 2, API 3 for Application 1 as shown at 902; API 1, API, API 2, API 3 for Application 2 as shown at 904; and API 1, API 2, API and API 3 for Application 3 as shown at 906. The average pattern determined from the three patterns may include API 1, API, API2 and API3 shown at 908.

Figure 10:
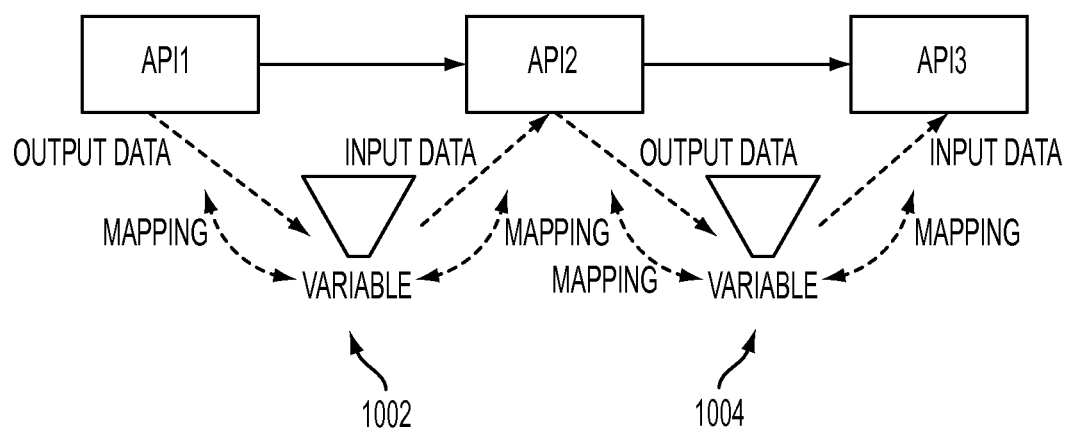
FIG. 10 is a diagram that illustrates analyzing of service orchestration for application pattern in one embodiment of the present disclosure.

FIG. 10 is a diagram that illustrates analyzing of service orchestration for application pattern. Given the 'average pattern', for example, determined using the algorithm shown with reference to FIG. 9, inputs and outputs to the APIs in the average pattern are identified. Analyzing service orchestration may include defining the variable (e.g., 1002, 1004) that flows in the API calls. The variable can be mapped to the input data or the output data. If data from one activity is to be passed to the next activity in an orchestration, the data is first be written to a variable as the output of the first activity before being read from the variable as the input to the next activity.

Analyzing service orchestration may also include observing the variables transformation in the log based on a number of API calls. Observing the variables transformation, the sequence and logic among APIs can be identified. For example, API log can be represented in the following format: "instanceID-variable-endpointURL-activity-input data-output data-variable-endpointURL-activity-input data . . ." Variable has its name and data type. If a variable always maps to the output data of one API and the input data of another API, the two APIs are sequential. If a variable sometimes maps to one API's input data, and sometimes maps to another API's input data, then these APIs are in if-else or case relationship. If the sequence of APIs has been determined, e.g., API 1 is ahead of API 2, while in the log, the variable following API 2 maps to the input data of API 1, then it can be said that they are in a loop. If a variable is split to map to different APIs' input data, then the logic before these API calls is split. If several APIs' output data is merged into one variable, the logic after these APIs is merged. The service orchestration that shows the logic of the application pattern, e.g., based on the variables transformation may be presented to a user of the pattern, e.g., to help in understanding what the pattern does and how it works. In another aspect, the pattern may be presented to the user without this service orchestration, e.g., as a black box.

Figure 11:
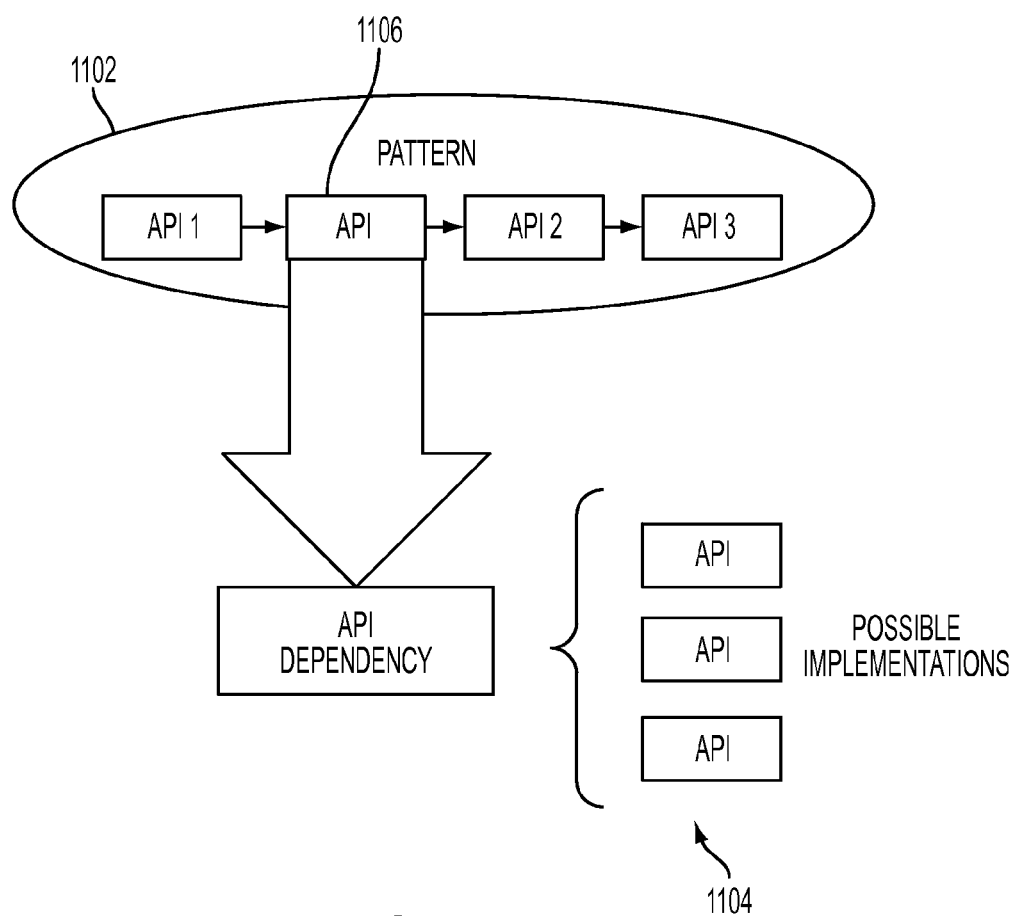
FIG. 11 is a diagram that shows determining API dependencies for application pattern in one embodiment of the present disclosure.

FIG. 11 is a diagram that shows determining API dependencies for application pattern in one embodiment of the present disclosure. Given the 'average pattern', determined as described above, this process replaces infrequent APIs with API dependencies. In one embodiment, possible implementations of the dependencies are inferred from the infrequent APIs found in the application API sequence. For example, the API sequence shown at 1102 has API 1, API, API 2 and API 3. A developer may use this API pattern to develop an application. In this example sequence, the developer would use API 1, API2 and API 3 as is. However, API 1106 is previously determined infrequent API and is generic. Thus, a developer supplies one or more replacement APIs to fill in the place of the API 1106. In one embodiment of the present disclosure, possible implementation APIs 1104 may be recommended to the developer to fulfill the API dependency, from which the developer may select and use. In one embodiment, possible implementations may be derived from the list of infrequent APIs found in the API call logs.

The following is an example algorithm that may be used to generate orderings (partial or bidirectional) among APIs ahead of time only from their description, in one embodiment of the present disclosure. This algorithm and the resulting ordering may supplement the sequence determined according to the method described above:

```
Input:
    Set A of APIs, having APIs a_j: <I_j, O_j>, where I_J and O_j
    refer to their inputs and outputs respectively. I_j and O_j
    include parameters p_k_name: p_k_type where p_k_name is the
    name and p_k_type is the type of the parameter.
Output:
    Must-Order: Set of orderings, O, having ordering, o_i :<a_m,
    a_n>, implying API a_m must occur before a_n.
    May-Order: Set of pairs, P, having pair, p_i :<a_m, a_n>,
    implying API a_m and a_n may occur in any order
Steps:
    Must-Order = { }, May-Order = { }
    Repeat until Must-Order increases no more
        Pick a_m, a_n from A
        If an input parameter of a_n matches an output of a_m
            Add <a_m, a_n> to Must-Order
    Repeat until no more conflicting orderings found in Must-Order,
    o_i:<a_m, a_n>, and o_j:<a_n, a_m>
        Remove o_i and o_j from Must-Order
        Add <a_m, a_n> to May-Order
    Return Must-Order, May-Order
```

A methodology for application pattern discover in one embodiment may identify the API association in the context of similar business scenarios, and identify the API sequence by combining the API interface mapping and API invocation log analysis. While known technique rely on an existing execution instance identifier to determine a workflow, API calls do not provide such as identifier. The methodology of the present disclosure that performs input and output mapping discovery allows for determining workflow, and application pattern discovery.

A system may be provided with one or more computers and a database having a plurality of service API records. A runtime platform may hosts applications built by composing above service APIs. The service API calls made by the applications are logged in the database or other storage. A process running on the one or more computers identifies service API associations, reverse-engineers service API call sequences, determines patterns of service API call sequences (application pattern), determines API dependencies for application pattern. In addition, the discovered API dependencies may be validated with description-induced API-dependencies. For example, if API description that describes the function of the API and the inputs and outputs, the description may be parsed and compared again the discovered application pattern to validate the pattern and dependencies.

Figure 12:
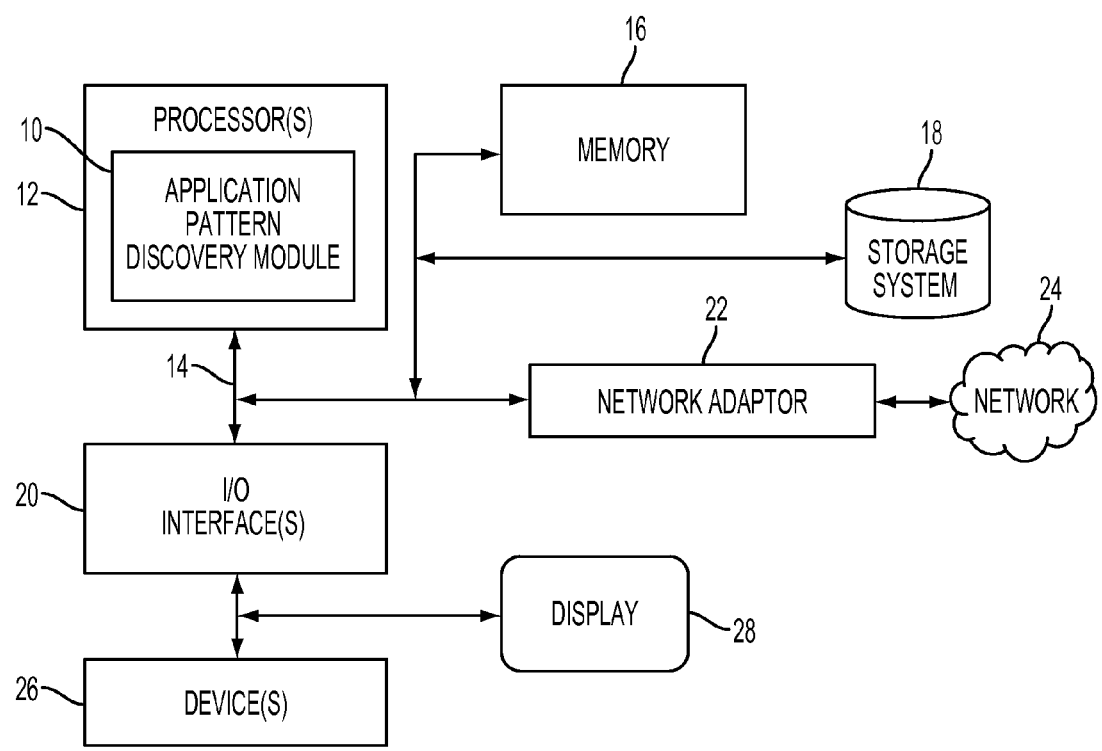
FIG. 12 illustrates a schematic of an example computer or processing system that may implement an application pattern discovery system in one embodiment of the present disclosure.

FIG. 12 illustrates a schematic of an example computer or processing system that may implement the application pattern discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an application pattern discovery module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for application pattern discovery, comprising:
    receiving application programming interface (API) call logs, the application programming interface call logs comprising data associated with invocation of a plurality of application programming interfaces by a plurality of applications;
    identifying, by a processor, API associations among said plurality of application programming interfaces by analyzing the API call logs, wherein the identifying API associations identifies sets of APIs that are determined to be called together;
    selecting a set of APIs from the sets of APIs;
    identifying, by the processor, a plurality of applications that invoke the set of APIs;
    identifying, by the processor, a sequence of API calls by an application in the plurality of applications, wherein multiples sequences of APIs are identified, one sequence of API calls identified respectively for one application in the plurality of applications; and
    determining, by the processor, an application pattern based on the multiple sequences of APIs,
    determining the application pattern further comprising treating infrequent APIs invoked in the plurality of applications as a single API, the application pattern comprising the single API, and determining an average sequence of the multiple sequences of APIs, the average sequence defined as a sequence that minimizes a sum of edit distances to the multiple sequences.

2. The method of claim 1, wherein the application pattern comprises calls to the single API and APIs in the set of APIs, the method further comprising:
    determining one or more API dependencies for the single API; and
    suggesting one or more specific APIs to replace the one or more API dependencies.

3. The method of claim 1, further comprising repeating the identifying a plurality of applications, the identifying a sequence of API calls by an application and the determining an application pattern, for each of the sets of APIs.

4. The method of claim 1, wherein the identifying a sequence of API calls comprises reverse engineering the API calls based on inputs and outputs of APIs invoked by the application.

5. The method of claim 4, wherein the reverse engineering the API calls is further based on timestamp information in the API call logs.

6. The method of claim 1, further comprising verifying the application pattern based on text parsing of description associated with the application.

7. A computer readable storage medium storing a program of instructions executable by a machine to perform a method of application pattern discovery, comprising:
    receiving application programming interface (API) call logs, the application programming interface call logs comprising data associated with invocation of a plurality of application programming interfaces by a plurality of applications;
    identifying API associations among said plurality of application programming interfaces by analyzing the API call logs, wherein the identifying API associations identifies sets of APIs that are determined to be called together;
    selecting a set of APIs from the sets of APIs;
    identifying a plurality of applications that invoke the set of APIs;
    identifying a sequence of API calls by an application in the plurality of applications, wherein multiples sequences of APIs are identified, one sequence of API calls identified respectively for one application in the plurality of applications; and
    determining an application pattern based on the multiple sequences of APIs,
    determining the application pattern further comprising treating infrequent APIs invoked in the plurality of applications as a single API, the application pattern comprising the single API, and determining an average sequence of the multiple sequences of APIs, the average sequence defined as a sequence that minimizes a sum of edit distances to the multiple sequences.

8. The computer readable storage medium of claim 7, wherein the application pattern comprises calls to the single API and APIs in the set of APIs, the method further comprising:
    determining one or more API dependencies for the single API; and
    suggesting one or more specific APIs to replace the one or more API dependencies.

9. The computer readable storage medium of claim 7, further comprising repeating the identifying a plurality of applications, the identifying a sequence of API calls by an application and the determining an application pattern, for each of the sets of APIs.

10. The computer readable storage medium of claim 7, wherein the identifying a sequence of API calls comprises reverse engineering the API calls based on inputs and outputs of APIs invoked by the application.

11. The computer readable storage medium of claim 10, wherein the reverse engineering the API calls is further based on timestamp information in the API call logs.

12. The computer readable storage medium of claim 7, further comprising verifying the application pattern based on text parsing of description associated with the application.

13. A system for application pattern discovery, comprising:
- a storage device storing application programming interface (API) call logs, the application programming interface call logs comprising data associated with invocation of a plurality of application programming interfaces by a plurality of applications; and
- a hardware processor operable to identify API associations among said plurality of application programming interfaces by analyzing the API call logs, wherein the identifying API associations identifies sets of APIs that are determined to be called together,
- the hardware processor further operable to select a set of APIs from the sets of APIs,
- the hardware processor further operable to identify a plurality of applications that invoke the set of APIs,
- the hardware processor further operable to identify a sequence of API calls by an application in the plurality of applications, wherein multiples sequences of APIs are identified, one sequence of API calls identified respectively for one application in the plurality of applications,
- the hardware processor further operable to determine an application pattern based on the multiple sequences of APIs,
- the hardware processor operable to treat infrequent APIs invoked in the plurality of applications as a single API, the application pattern comprising the single API, the hardware processor further operable to determine an average sequence of the multiple sequences of APIs, the average sequence defined as a sequence that minimizes a sum of edit distances to the multiple sequences, the hardware processor further operable to determine an ordering of the API calls in the application pattern, the ordering comprising a must-order list and a may-order list, the must-order list specifying a first pair of APIs wherein one of the first pair must occur before another of the first pair, the may-order specifying a second pair of APIs wherein the APIs in the second pair can occur in any order.

14. The system of claim 13, wherein the application pattern comprises calls to the single API and APIs in the set of APIs, and the hardware processor is further operable to determine one or more API dependencies for the single API, and suggest one or more specific APIs to replace the one or more API dependencies.

15. The system of claim 13, wherein the hardware processor is further operable to repeat the identifying a plurality of applications, the identifying a sequence of API calls by an application and the determining an application pattern, for each of the sets of APIs.

16. The system of claim 13, wherein the hardware processor identifies a sequence of API calls by reverse engineering the API calls based on inputs and outputs of APIs invoked by the application.

17. The system of claim 16, wherein the reverse engineering the API calls is further based on timestamp information in the API call logs.

18. The system of claim 13, wherein the hardware processor is further operable to verify the application pattern based on text parsing of description associated with the application.

19. The system of claim 13, wherein the hardware processor is further operable to store the application pattern and allow a user to select the application pattern for program development.

20. The system of claim 13, wherein the hardware processor is further operable to identify and present logic of the application pattern based on variable transformations of APIs specified in the application pattern.

* * * * *